United States Patent

Fujii

[11] Patent Number: 5,818,683
[45] Date of Patent: Oct. 6, 1998

[54] VARIABLE CAPACITOR

[75] Inventor: Yasutaka Fujii, Nagaokakyo, Japan

[73] Assignee: Murata Manufacturing Co., Ltd., Japan

[21] Appl. No.: 699,792

[22] Filed: Aug. 19, 1996

[30] Foreign Application Priority Data

Aug. 18, 1996 [JP] Japan ................................. 7-210718

[51] Int. Cl.⁶ .................................................. H01G 5/00
[52] U.S. Cl. ........................................ 361/277; 361/278
[58] Field of Search .................................. 361/271, 277, 361/278, 280, 283.1, 283.2, 283.3, 287, 292; 29/25.42; 359/291, 315

[56] References Cited

U.S. PATENT DOCUMENTS

| 5,526,172 | 6/1996 | Kanack ................................. 359/291 |
| 5,561,248 | 10/1996 | Negoro .............................. 73/514.32 |

FOREIGN PATENT DOCUMENTS

| 0194953 | 2/1986 | European Pat. Off. . |
| 0637042A2 | 7/1994 | European Pat. Off. . |
| 0 637 042 A2 | 1/1995 | European Pat. Off. . |
| 5074655 | 7/1993 | Japan . |

OTHER PUBLICATIONS

"Micromachined tunneling displacement transducers for physical sensors", T.W. Kenny et al., 8257a Journal of Vacuum Science & Technology A, No. 4, Part I, Jul./Aug. 1993.

Primary Examiner—Kristine Kincaid
Assistant Examiner—Anthony Dinkins
Attorney, Agent, or Firm—Ostrolenk, Faber, Gerb & Soffen, LLP

[57] ABSTRACT

A small variable capacitor including a movable section composed of a movable electrode supported by a supporting section. A driving electrode and a detecting electrode are provided facing the movable electrode. When an external bias voltage is applied between the movable electrode and the driving electrode, Coulomb force is generated between them. Due to that, the movable section is attracted toward the driving electrode while keeping a balance between its own resilience force and the Coulomb force. At this time, part of the movable section facing the detecting element is displaced more than the other part of the movable section facing the driving electrode. Thereby, because an electrostatic capacity between the movable section and the detecting electrode is inversely proportional to the average distance, a large electrostatic capacity may be obtained and variability of the electrostatic capacity becomes large.

8 Claims, 4 Drawing Sheets

VARIABLE CAPACITOR

BACKGROUND OF THE INVENTION

1. Field of the Invention

The present invention relates to a variable capacitor which is one type of a voltage variable capacitive element.

2. Description of Related Art

Hitherto, as a variable capacitive element, there has been known a variable capacitor comprising a stator composed of a plurality of fixed plates and a rotor facing the fixed plate and composed of a rotary plate which rotates without touching the fixed plates when a shaft thereof is turned. The stator and the rotor are disposed leaving a certain space therebetween and an electrostatic capacity is varied by turning the rotor and changing their opposed areas. However, it has been difficult to miniaturize the variable capacitor because it requires a turning mechanism for turning the rotor by using a motor or the like.

Further, there has been known a variable capacitive diode in which an electrostatic capacity varies when an external bias voltage is applied to a spatial charge region on a surface of a semiconductor surrounded by an insulating layer. Although electrostatic capacity of the variable capacitive diode may be varied, it has been necessary to increase internal resistance in order to improve electric strength. However, this presents the problem that when the internal resistance is increased, a value of Q indicating an index of performance of the capacitor expressed by ½ πfcr (where f is frequency, c is electrostatic capacity and r is internal resistance) becomes small, thus deteriorating frequency stability and increasing carrier noises.

Further, there has been known a variable capacitor described in Japanese Patent Laid-Open No. Hei. 5-74655. As shown in FIG. 6, the variable capacitor comprises a fixed electrode 1 and a movable electrode 2, which are both formed as a thin film, and is constructed so that they are supported so as to face each other via a space section 4 provided in an insulating support base 3. The insulating support base 3 is a silicon substrate, for example, and the fixed electrode 1 formed by evaporating aluminum, for example, is provided at the bottom of the space section 4 which is a concave section formed by engraving the substrate at one face. The movable electrode 2 similarly formed is provided so as to float by the edge of the opening of the concave section via the space section 4 and so that an external bias voltage can be applied between terminals (not shown) formed by leading out one end of the fixed electrode 1 and the movable electrode 2, respectively. When an external bias voltage is applied between the fixed electrode 1 and the movable electrode 2, a distance between the fixed electrode 1 and the movable electrode 2 increases/decreases by an action of Coulomb force generated between them, thus varying an electrostatic capacity.

This variable capacitor has a problem that when the movable electrode 2 is displaced by more than ⅓ of the distance between the fixed electrode 1 and the movable electrode 2, when no external bias voltage is applied, a balance between a resilience (stability) of a thin plate on which the movable electrode 2 is formed for returning to the original position and the Coulomb force generated between the fixed electrode 1 and the movable electrode 2 is lost and thus the movable electrode 2 is attracted toward the fixed electrode 1. Due to that, the variability of the electrostatic capacity cannot be increased.

Accordingly, it is an object of the present invention to provide a small variable capacitor having an excellent electrical strength, a high frequency stability and a large variability of electrostatic capacity even though it is a single element.

SUMMARY OF THE INVENTION

In order to achieve the aforementioned goals, a variable capacitor of the present invention comprises an insulating support base; a driving electrode formed on the surface of the insulating support base; a detecting electrode formed on the surface of the insulating support base and spaced from the driving electrode; and a movable electrode having a resilient movable section provided facing the driving electrode and the detecting electrode.

Preferably, the movable electrode, the driving electrode and the detecting electrode are structured and arranged such that, when a voltage is applied between the driving electrode and the movable electrode, the movable section moves so that an average distance between the detecting electrode and the movable section is narrowed more than an average distance between the driving electrode and the movable section while keeping a balance between a Coulomb force generated when a voltage is applied between the driving electrode and the movable electrode and the resilience of the movable section.

When an external bias voltage is applied between the driving electrode and the movable electrode, Coulomb force is generated between them. Due to that, the movable section is attracted toward the driving electrode while keeping a balance between its own resilience and the Coulomb force. At this time, part of the movable section facing the detecting element is displaced more than the other part of the movable section facing the driving electrode. In other words, the average distance between the movable section and the detecting electrode becomes narrower as compared to the average distance between the movable section and the driving electrode. Thereby, because an electrostatic capacity between the movable section and the detecting electrode is inversely proportional to the average distance of both, the electrostatic capacity between the detecting electrode and the movable section becomes large and variability of the electrostatic capacity between them becomes large.

The above and other related objects and features of the present invention will be apparent from a reading of the following description of the disclosure found in the accompanying drawings and the novelty thereof pointed out in the appended claims.

BRIEF DESCRIPTION OF DRAWINGS

FIGS. 1(a) and 1(b) show a variable capacitor of the present invention, wherein FIG. 1(a) is a perspective view thereof and FIG. 1(b) is a section view taken along A—A' in FIG. 1(a);

FIGS. 4(a) and 4(b) show another variable capacitor of the present invention, wherein FIG. 4(a) is a perspective view thereof and FIG. 4(b) is a section view taken along A—A' in FIG. 4(a);

DESCRIPTION OF PREFERRED EMBODIMENTS

First Embodiment

Figure 1A:
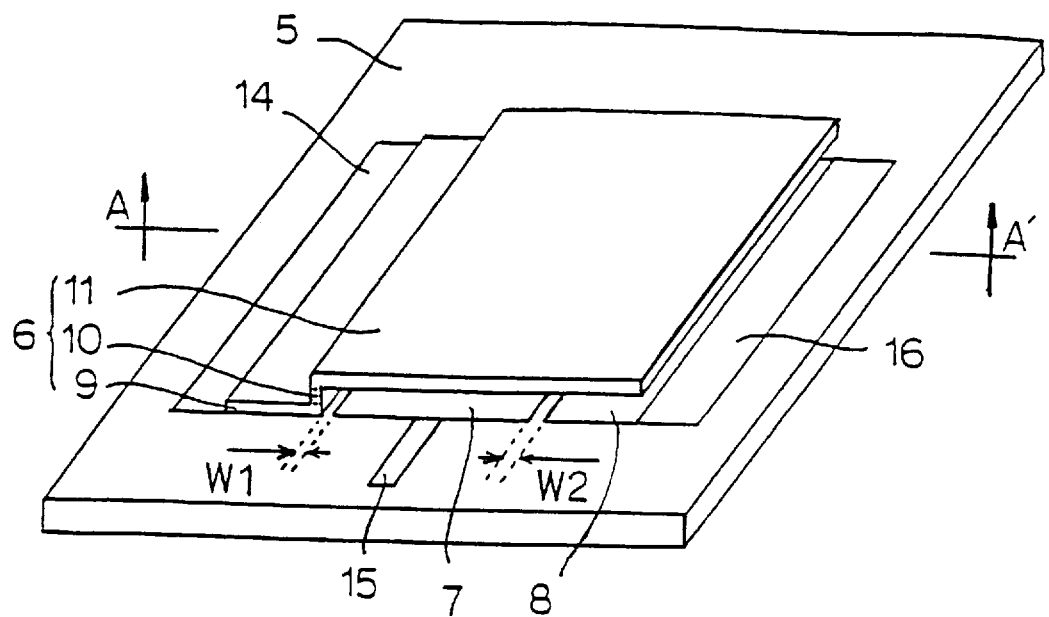
Figure 1B:
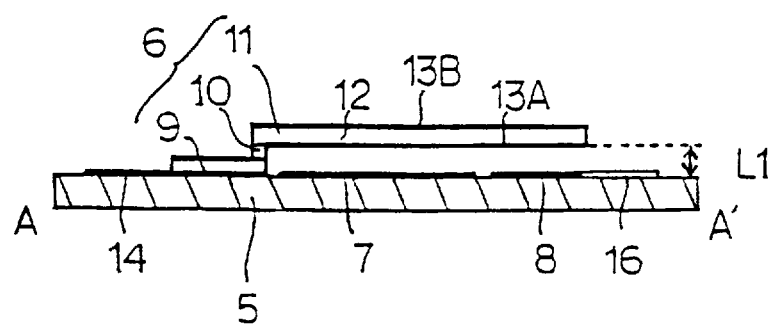

A preferred embodiment of a variable capacitor of the present invention will be explained with reference to FIGS. 1(a) and 1(b).

The variable capacitor comprises an insulating support base 5, a movable electrode 6, a driving electrode 7 and a detecting electrode 8.

The insulating support base 5 is a square plate formed out of an insulating maternal, such as glass and ceramics.

The movable electrode 6 is composed of a fixed section 9, a supporting section 10 and a movable section 11 in a body.

The fixed section 9 made from a rectangular plate is fixed on the surface of the insulating support base 5 near the edge thereof so that the edge of the insulating support base 5 is parallel with a long side of the fixed section 9.

The plate-like supporting section 10 is provided vertically at the edge of the long side of the fixed section 9 on the middle side of the insulating support base 5.

An edge of one long side of the movable section 11 made from a rectangular plate is fixed on the upper end face of the supporting section 10. As a result, the movable section 11 is supported by the supporting section 10 and is kept parallel with the surface of the insulating support base 5 while floating therefrom.

It is noted that the movable section 11 has a laminated structure of a silicon oxide (SiO2) layer 12, a conductor layer 13A formed on the back of the silicon oxide layer 12 and a conductor layer 13B formed on the surface of the silicon oxide layer 12. That is, the moveable section 11 is a laminated structure in which the surface and back are symmetrical about the silicon oxide layer 12. Thereby, the movable electrode 6 or the movable section 11 in particular is prevented from warping because stress generated on the surface and back of the silicon oxide layer 12 cancel each other. Further, because the movable section 11 is formed so thin, about 1 μm, it is very light. As a result, the edge portion of the movable section 11 will not droop and a gap L1 between the movable section 11 and the insulating support base 5 is kept constant. Further, a mechanical resonance frequency of the movable section 11 is set high in order to prevent the movable section 11 from readily vibrating due to vibration or the like applied to the variable capacitor from the outside. To that end, an aluminum thin film having a light specific weight is generally used for the conductor layers 13A and 13B. The conductor layer 13B is electrically connected with a rectangular lead electrode 14 formed on the surface of the insulating support base 5. It is noted that the lead electrode 14 is enlarged as much as possible to reduce resistance.

The driving electrode 7 is a rectangular thin film electrode formed out of a material having a low resistivity, such as aluminum and gold. A length of a long side thereof is equal with the long side of the movable electrode 6 and a length of a short side thereof is about ⅔ of a length of a short side of the movable electrode 6 from the supporting section 10 to the free end. The driving electrode 7 is formed on the surface of the insulating support base 5 facing the movable section 11 while leaving a certain gap W1 between the supporting section 10. It is noted that a lead electrode 15 electrically connected with the middle portion of the short side of the driving electrode 7 is formed on the surface of the insulating support base 5.

The detecting electrode 8 is a rectangular thin film electrode formed out of a material having a low resistivity, such as aluminum and gold. The length of the long side thereof is equal to the long side of the movable electrode 6 and the length of the short side thereof is about ⅓ of the length of the short side of the movable electrode 6. The detecting electrode 8 is formed on the surface of the insulating support base 5 facing the movable section 11 while leaving a certain gap W2 between the long side of the driving electrode 7. It is noted that a lead electrode 16 electrically connected with the long side of the detecting electrode 8 on the side distant from the driving electrode 7 is formed on the surface of the insulating support base 5. The lead electrode 16 is enlarged as much as possible to reduce resistance.

A method for manufacturing the variable capacitor will be explained below with reference to FIGS. 2(a) through 2(d). It is noted that FIGS. 2(a) through 2(d) are section views taken along A—A' in FIG. 1(a) at various stages in the manufacturing process.

Figure 2:
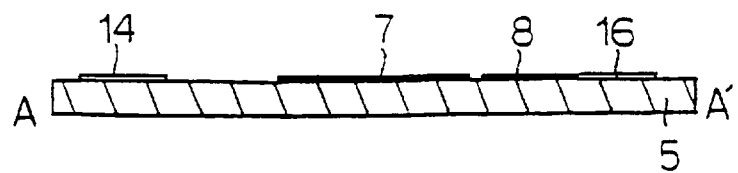
FIGS. 2(a) through 2(d) are section views taken along the same section as A—A' in FIG. 1A at various stages in a manufacturing process of the inventive variable capacitor of FIGS. 1(a) and 1(b)
Figure 2:
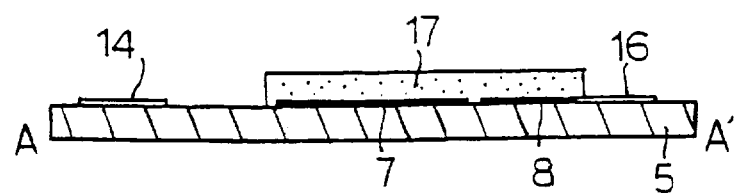
Figure 2:
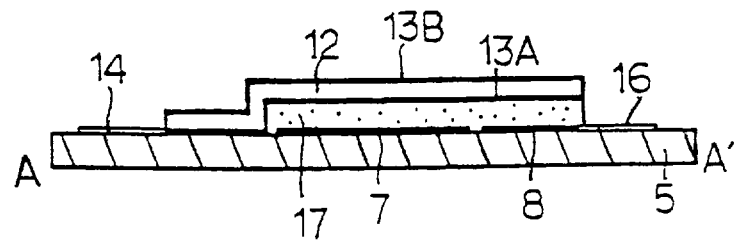
Figure 2:
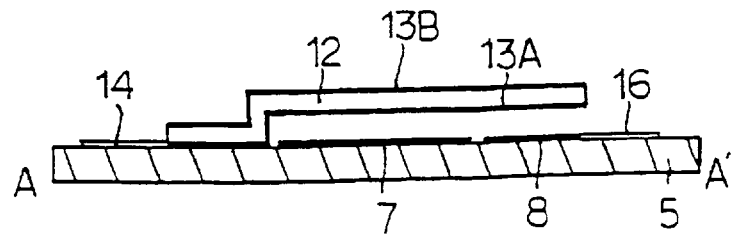

The driving electrode 7, the detecting electrode 8 and lead electrodes 14, 15 and 16 are formed on the surface of the insulating support base 5 by means of evaporation or sputtering by using mask patterns having predetermined shapes (FIG. 2(a)).

Next, as shown in FIG. 2(b), a sacrificial layer 17 which is a rectangular plate made out of zinc oxide (ZnO) for example and having a certain thickness is formed so as to cover the surface of the driving electrode 7 and the detecting electrode 8. The sacrificial layer 17 is formed by means of evaporation, sputtering or the like by using a mask pattern having a predetermined shape.

Then, the Al conductor layer 13A is formed on the surface of the sacrificial layer 17, on a long side face of the sacrificial layer 17 facing the side of the lead electrode 14 and on the surface of the insulating support base 5 between the long side face of the sacrificial layer 17 facing the side of the lead electrode 14 and the lead electrode 14.

Next, the silicon oxide layer 12 is formed on the surface of the conductor layer 13A by means of sputtering, plasma CVD or the like by using a mask pattern having a predetermined shape. It is noted that part of the silicon oxide layer 12 formed on the sacrificial layer 17 is formed so as to be about 1 μm of thickness to make it thinner as compared to other parts. Further, the Al conductor layer 13B is formed on the surface of the silicon oxide layer 12 by means of evaporation, sputtering or the like by using a mask pattern having a predetermined shape (FIG. 2(c)).

Then, as shown in FIG. 2(d), the variable capacitor is completed by removing the sacrificial layer 17 by means of chemical etching or the like.

Operation of the variable capacitor constructed as described above will be explained below.

When a DC external bias voltage is applied between the movable electrode 6 and the driving electrode 7 via the lead electrodes 14 and 15, Coulomb force is generated between the movable electrode 6 and the driving electrode 7. As a result, the movable section 11 is attracted toward the driving electrode 7 about a fulcrum 11' (FIG. 3) on the upper end face of the supporting section 10. The movable section 11 also generates a resilience force to return to the original position. As a result, the movable section 11 is displaced to and rests at a position where the Coulomb force balances with the resilience force.

Figure 3:
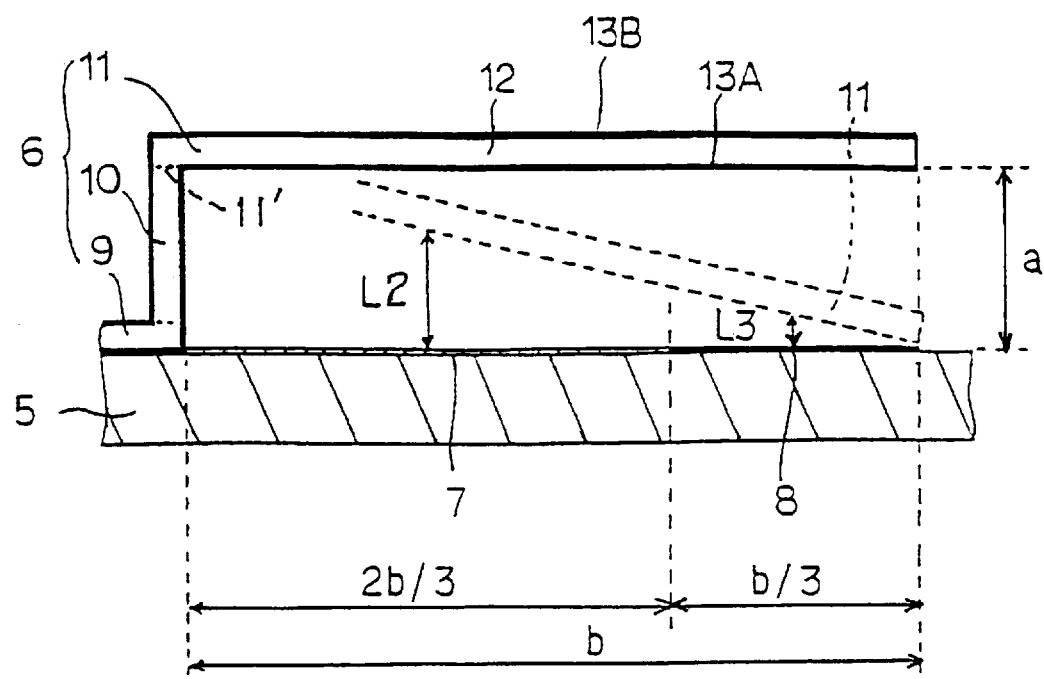
FIG. 3 is a diagram showing a relationship between an average distance between a movable section and a middle portion of a short side of a driving electrode and that between the movable section and a middle portion of a short side of a detecting electrode when a voltage is applied between the driving electrode and the movable electrode in the inventive variable capacitor of FIGS. 1(a) and 1(b)
Figure 6:
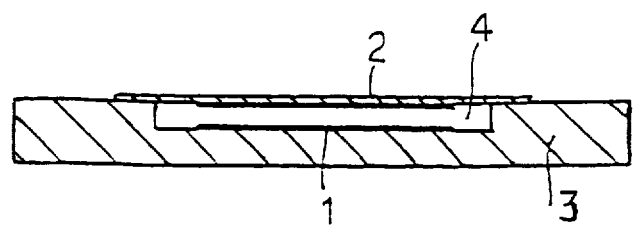
FIG. 6 is a section view showing a prior art variable capacitor.

A relationship of displacement of the driving electrode 7 and the movable section 11 and the detecting electrode 8 and the movable section 11 when the movable section 11 is displaced will be explained in detail with reference to FIG. 3. Assume here a width of the gap L1 between the driving electrode 7 and the movable section 11 when no external bias voltage is applied between the movable electrode 6 and the driving electrode 7 as 'a' and a value of the short side of the movable section 11 as 'b'. While, as seen in FIG. 1(a), the gap W1 is provided between the driving electrode 7 and the supporting section 10 and the gap W2 is provided between the driving electrode 7 and the detecting electrode 8 originally, the explanation will be made by neglecting the gaps W1 and W2 for the convenience of calculation and by assuming that a length of the driving electrode 7 in the direction of the short side is 2b/3 and a length of the detecting electrode 8 in the direction of the short side is b/3.

The balance between the Coulomb force between the movable electrode 6 and the driving electrode 7 and the resilience force of the movable section 11 is achieved when an average distance L2 between the middle portion of the short side of the driving electrode 7, which is a point of action of a resultant force of the Coulomb force and the movable section 11, is a $\geq L2 \geq 2a/3$. When the movable section 11 is displaced under this condition, an average distance L3 between the middle portion of the short side of the detecting electrode 8 and the movable section 11 varies within a range of a $\geq L3 \geq a/6$. An electrostatic capacity between the detecting electrode 8 and the movable section 11 is inversely proportional to the average distance L3. Therefore, when the value of the average distance L3 between the detecting electrode 8 and the movable section 11 changes from a in the beginning to a/6, the electrostatic capacity between the detecting electrode 8 and the movable section 11 increases by six times (=a÷(a/6) as compared to the electrostatic capacity at the beginning. Accordingly, it not only allows a very large electrostatic capacity to be obtained but also substantially increases the variability of the electrostatic capacity.

Second Embodiment

Figure 4A:
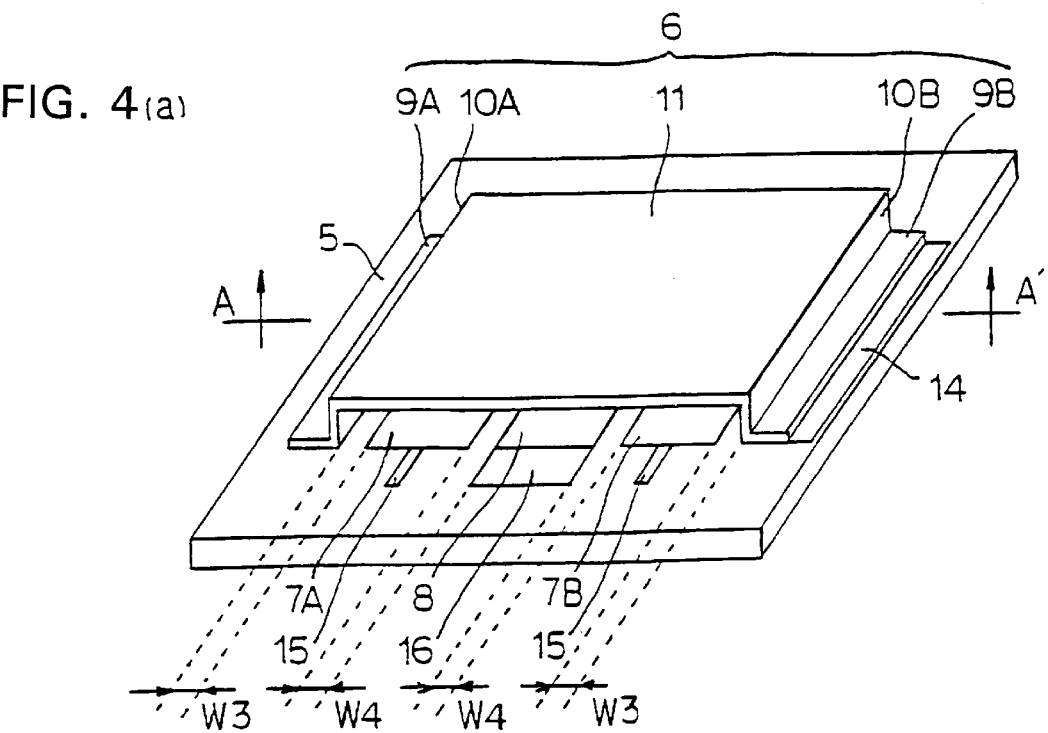
Figure 4B:
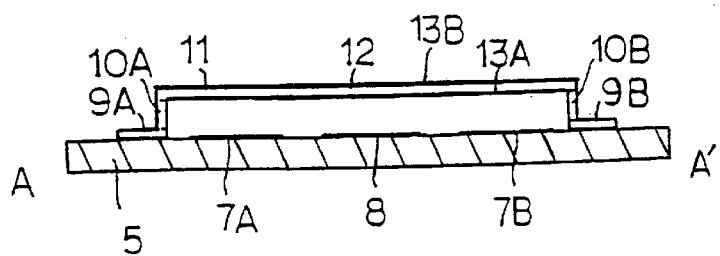

Another embodiment of the variable capacitor of the present invention will be explained by using FIGS. 4(a) and 4(b). It is different from the first embodiment in that both ends of a movable section 11 are supported by supporting sections 10A and 10B, that a detecting electrode 8 is provided on the surface of an insulating support base 5 while facing the middle portion of a movable section 11 and that driving electrodes 7A and 7B are disposed at both ends of the detecting electrode 8. The same reference numerals are used in this embodiment to designate components corresponding to those in the first embodiment and an explanation thereof will be simplified here.

The variable capacitor comprises the insulating support base 5, the movable electrode 6, the driving electrodes 7A and 7B and the detecting electrode 8.

The movable electrode 6 is composed of fixed sections 9A and 9B, supporting sections 10A and 10B and the movable section 11 in a body.

The fixed sections 9A and 9B made from a rectangular plate are fixed on the surface of the insulating support base 5 near both edges thereof opposing each other so that the edge of the insulating support base 5 is parallel with a long side of the fixed sections 9A and 9B.

The supporting sections 10A and 10B are provided vertically at the edge of the long side of the fixed sections 9A and 9B on the middle side of the insulating support base 5.

Both edges of opposing long sides of the movable section 11 made from a rectangular plate are fixed on the upper end surface of the supporting sections 10A and 10B, respectively. As a result, the movable section 11 is supported by the supporting sections 10A and 10B and is kept parallel with the surface of the insulating support base 5 while floating therefrom.

It is noted that the movable electrode 6 has a laminated structure of a silicon oxide (SiO2) layer 12, a conductor layer 13A formed on the back of the silicon oxide layer 12 and a conductor layer 13B formed on the surface of the silicon oxide layer 12. The conductor layer 13B is electrically connected with a rectangular lead electrode 14 formed on the surface of the insulating support base 5. The lead electrode 14 is enlarged as much as possible to reduce resistance.

The driving electrodes 7A and 7B are rectangular thin film electrodes formed out of a material having a low resistivity, such as aluminum and gold. The driving electrodes 7A and 7B are formed on the surface of the insulating support base 5 facing the movable section 11 while leaving a certain gap W1 from the supporting sections 10A and 10B, respectively. Lead electrodes 15 electrically connected with the middle portion of the short side of the driving electrodes 7A and 7B are formed on the surface of the insulating support base 5.

The detecting electrode 8 is a rectangular thin film electrode formed out of a material having a low resistivity, such as aluminum and gold. The detecting electrode 8 is formed between the driving electrodes 7A and 7B while leaving a certain gap W4 from the driving electrodes 7A and 7B, respectively. A lead electrode 16 electrically connected with the detecting electrode 8 is formed on the surface of the insulating support base 5. The lead electrode 16 is enlarged as much as possible to reduce resistance.

Figure 5:
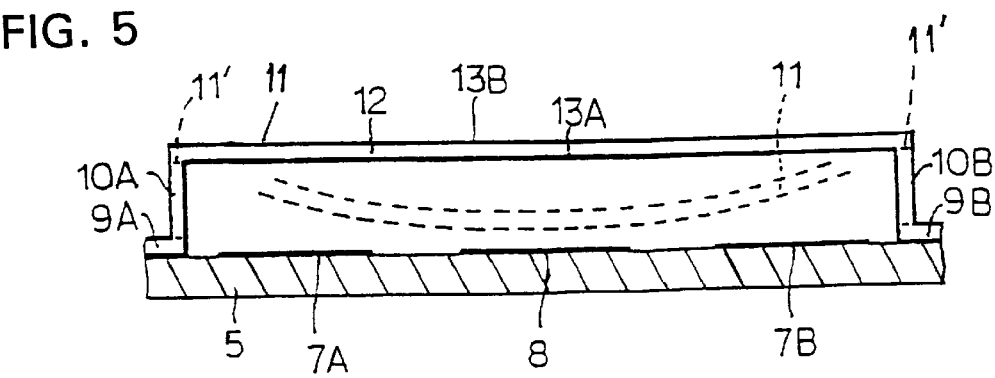
FIG. 5 is a view of the variable capacitor of FIGS. 4(a) and 4(b) showing a state in which the movable section is displaced when a voltage has been applied between the driving electrode and the movable electrode.

Operation of the variable capacitor constructed as described above will be explained below with reference to FIG. 5.

When a DC external bias voltage is applied between the movable electrode 6 and the driving electrodes 7A and 7B via the lead electrodes 14 and 15, a Coulomb force is generated between the movable electrode 6 and the driving electrodes 7A and 7B. As a result, parts of the movable section 11 facing the driving electrodes 7A and 7B are attracted toward the driving electrodes 7A and 7B about fulcrums 11', 11' of the upper end faces of the supporting sections 10A and 10B. The movable section 11 also generates a resilience force to return to the original position. As a result, the movable section 11 is displaced to and rests at a position where the Coulomb force balances with the resilience force.

At this time, part of the movable section 11 facing the detecting electrode 8 is displaced more as compared to the parts of the movable section 11 facing the driving electrodes 7A and 7B because it is distant from the upper end faces of the supporting sections 10A and 10B, thus reducing an average distance between the detecting electrode 8 and the movable section 11. Accordingly, it not only allows a very large electrostatic capacity to be obtained but also substantially increases the variability of the electrostatic capacity.

Accordingly, the present invention constructed as described above has the following effects. That is, the movable section is displaced while keeping the balance between the Coulomb force generated between the driving electrode and the movable electrode and the resilience of the moveable electrode. At this time, the average distance between the detecting electrode and the movable section varies significantly. An electrostatic capacity between them is proportional to an inverse number of this average distance. Due to that, the variability of the electrostatic capacity between the detecting electrode and the movable section becomes large. Further, a series resistance becomes very small as compared to a varactor diode. Therefore, a capacitor having a very high Q value expressed by ½ πfcr (where f is frequency, c is electrostatic capacity and r is internal resistance) can be obtained, thus improving a frequency stability. Further, because the gap between the movable section and the detecting electrode is insulated by air, the breakdown voltage of the variable capacitor is very high.

While preferred embodiments have been described, variations thereto will occur to those skilled in the art within the scope of the present inventive concepts which are delineated by the following claims.

What is claimed is:

1. A variable capacitor, comprising:
   an insulating support base;
   a driving electrode formed on a surface of said insulating support base;
   a detecting electrode formed on the surface of said insulating support base and spaced from said driving electrode;
   a movable electrode having a resilient movable section provided in spaced relationship to and facing said driving electrode and said detecting electrode;
   said driving electrode, said detecting electrode and said movable section each being planar in shape, with said driving electrode and said detecting electrode being coplanar and said movable section being parallel to said driving electrode and said detecting electrode in the absence of a voltage between said driving electrode and said movable electrode, said movable electrode having a fulcrum for said movable section, said fulcrum being spaced laterally and vertically from the driving electrode on a side of said driving electrode spaced furthest away from said detecting electrode; and
   lead electrodes for connecting said driving and movable electrodes to a source of voltage.

2. A variable capacitor according to claim 1, wherein the moveable electrode is a laminate comprised of a core of silicon oxide having conductive layers on opposite sides thereof.

3. A variable capacitor according to claim 2, wherein the conductive layers are made of aluminum.

4. A variable capacitor according to claim 3, in which the thickness of the movable section is approximately 1 μm.

5. A variable capacitor, comprising:
   an insulating support base;
   a detecting electrode formed on a surface of said insulating support base;
   a first driving electrode formed on the surface of said insulating support base and spaced on one side of said detecting electrode;
   a second driving electrode formed on the surface of said insulating support base and spaced from a second side of said detecting electrode;
   a movable electrode having a resilient movable section provided in spaced relationship to and facing said first and second driving electrodes and said detecting electrode,
   said first and second driving electrodes, said detecting electrode and said movable section each being planar in shape with said first and second driving electrodes and said detecting electrode being coplanar and said movable section being parallel to said first and second driving electrodes and said detection electrode in the absence of a voltage between said first and second driving electrodes and said movable electrode, said movable electrode having first and second fulcrums, said first fulcrum being spaced laterally and vertically from a side of the first driving electrode furthest from said detecting electrode and said second fulcrum being spaced laterally and vertically from a side of said second driving electrode spaced furthest from said detecting electrode; and
   lead electrodes for connecting said first and second driving electrodes and said movable electrode to a source of voltage.

6. A variable capacitor according to claim 5, wherein the moveable electrode is a laminate comprised of a core of silicon oxide having conductive layers on opposite sides thereof.

7. A variable capacitor according to claim 6, wherein the conductive layers are made of aluminum.

8. A variable capacitor according to claim 7, in which the thickness of the movable section is approximately 1 μm.

* * * * *